(12) United States Patent
Stoll et al.

(10) Patent No.: US 6,173,969 B1
(45) Date of Patent: Jan. 16, 2001

(54) SEALING RING

(75) Inventors: Kurt Stoll, Esslingen; Ulrich Kees, Ingbert, both of (DE)

(73) Assignee: Festo AG & Co., Esslingen (DE)

( * ) Notice: Under 35 U.S.C. 154(b), the term of this patent shall be extended for 0 days.

(21) Appl. No.: 09/203,034

(22) Filed: Dec. 1, 1998

(30) Foreign Application Priority Data

Dec. 10, 1997 (DE) .............................. 197 54 737

(51) Int. Cl.⁷ .............................. F16J 15/10; F16B 43/00
(52) U.S. Cl. .......................... 277/630; 277/641; 277/650; 411/372; 411/533; 411/542
(58) Field of Search ................... 277/603, 612, 277/616, 627, 630, 641, 650, 648, 596; 411/533, 542, 371.1, 372

(56) References Cited

U.S. PATENT DOCUMENTS

| | | | |
|---|---|---|---|
| 2,373,443 | * | 4/1945 | Armington ................... 286/7 |
| 3,930,656 | * | 1/1976 | Jelinek ..................... 277/180 |
| 4,468,042 | * | 8/1984 | Peppert et al. ............. 277/188 |
| 4,692,928 | * | 9/1987 | Abele ........................ 277/235 |
| 4,778,321 | * | 10/1988 | Okawa ..................... 411/523 |
| 5,172,919 | * | 12/1992 | Takasaki et al. .......... 277/227 |
| 5,342,096 | * | 8/1994 | Bachle et al. ............. 411/533 |
| 5,390,939 | * | 2/1995 | Terauchi et al. .......... 277/227 |
| 5,536,018 | * | 7/1996 | Szott ............................ 277/1 |
| 5,564,714 | * | 10/1996 | Katsuno et al. ........... 277/9.5 |

FOREIGN PATENT DOCUMENTS

| | | |
|---|---|---|
| 39 18 891 | 9/1990 | (DE) . |
| 0 177 709 A 1 | 4/1986 | (EP) . |
| 739 490 | 11/1955 | (GB) . |

* cited by examiner

Primary Examiner—Anthony Knight
Assistant Examiner—Vishal Patel
(74) Attorney, Agent, or Firm—Hoffman & Baron, LLP

(57) ABSTRACT

A sealing ring having a base body manufactured of thermoplastic synthetic resin material and a sealing body of elastomeric synthetic resin material. The two bodies are molded permanently on one another and each possess a sealing section, which serves for producing a sealing action at sealing faces of two oppositely placed components which are to be sealed in relation to each other.

11 Claims, 2 Drawing Sheets

SEALING RING

BACKGROUND OF THE INVENTION

The invention relates to a sealing ring, which at its two mutually opposite axial sides respectively possesses an annular sealing section and which has an annular base body, which is manufactured of synthetic resin and is adapted to endow the sealing ring with dimensional stability, and furthermore possesses an annular sealing body arranged concentrically in relation to the base body and having rubber-elastic properties.

DESCRIPTION OF THE PRIOR ART.

A sealing ring of this type is for example disclosed in the German patent publication 3,918,891. This known sealing ring has an L-shaped base body made of metal or a rigid synthetic resin, on which the annular sealing body is fixed. The sealing ring is axially placed between two faces (herein referred to as the sealed faces) between which a sealing effect is to be produced on the two components, the sealing body being acted upon in the fitted condition from axially opposite sides by the sealed faces. The two sealing sections, causing the sealing action, of the sealing ring are provided on the sealing body, whereas the base body performs a purely supporting function and prevents crushing of the sealing body.

Although the known sealing ring has excellent properties in use, it is relative expensive to manufacture. Furthermore a substantial thrust force must be exerted in order to deform the sealing body sufficiently so that it engages the associated sealed faces at the two sealing sections.

SHORT SUMMARY OF THE INVENTION

One object of the invention is to provide a sealing ring which while ensuring a reliable sealing ring action is simpler and cheaper to produce.

In order to achieve these and/or other objects appearing from the present specification, claims and drawings, in the present invention the base body is made to of thermoplastic synthetic resin and its one axial side itself directly constitutes the first sealing section and the sealing body forming the second sealing section is made of elastomeric synthetic resin material and is permanently molded on the axial side, which is opposite the first sealing section, with the formation of a dual-material injection molding on the base body.

It is in this manner that the invention leads to a sealing ring consisting completely of synthetic resin, which can be manufactured very simply and economically as a dual-material injection molding. For the material of the base body thermoplastic synthetic resin is employed, which possesses sufficient strength and rigidity in order to provide the sealing ring with the desired dimensional stability. As a sealing body elastomeric material is employed, which is integrally and permanently formed on the base body by injection molding. The arrangement is such that the base body does not solely function as a carrier for the sealing body, but also represents a sealing body, on which one of the two annular sealing sections is formed. Although the base body does not possess the same ability to deform as the sealing body, the resiliency is sufficient to perform a reliable sealing effect on sealed faces with a high surface quality. The elastomeric body on the contrary is also suitable for sealing against sealed faces with a high degree of roughness so that the sealing ring is more particularly suitable for initial fitting to equipment, which is composed of components produced by the manufacturer itself together with parts from other sources, whereas as regards the parts produced by the manufacturer a high surface quality may be ensured quite readily, whereas in the case of which the parts from other sources variations in surface roughness may be expected.

If after a long period of use the thrust forces acting on the sealing sections should be reduced owing to creep of the thermoplastic material, this will be compensated for by the elastic deformation capacity of the elastomeric body. Accordingly leaks are unlikely even after long periods of use.

Further advantageous developments of the invention are defined in the claims.

In order to optimize the sealing properties of the thermoplastic base body the first sealing section provided on it may have at least one annular axial projection, which more particularly has an encircling sealing edge so that linear engagement on the sealed face of the associated component may be achieved, this leading to an even better sealing action owing to the higher surface pressing force.

If required it is readily possible for several, concentrically arranged axial projections to be present, which in cooperation with the associated sealed face may also lead to a labyrinth sealing effect.

Functionally adjacent to the inner periphery of the sealing ring it is convenient to provide several peripherally distributed holding projections, which ensure a locking of the sealing ring in place without any possibility of loss, when for example the sealing ring is slipped onto a male thread of a screw part. The holding projections may in this case also possess a centering action and prevent transverse displacement in relation to the associated component so that the sealing sections arc always correctly aligned with the opposite sealed faces.

In the case of the holding projections it is a question preferably of elastomeric parts formed integrally with the sealing body, such projections being formed by injection molding on the radially inwardly directed inner peripheral face of the base body.

The sealing ring is more especially suitable for use between two axially facing sealed faces, which are provided on two fluid power components to be connected together. One of the components may in this respect be a screw part, as for instance a plug or a screwed component, which possesses a spigot-like threaded part provided with an external screw thread adapted for instance to be screwed into a female thread of another component, as for example a valve or a fluid power cylinder. The sealing ring is in this case directly slipped over the threaded part coaxially, the holding projections also present ensuring locking on the threaded part.

The sealing ring can be so inserted that the component cooperating with the sealing body normally is free of contact with the base body. However the design may also be such that on the axial side bearing the sealing body the base body has at least one supporting face, which the associated component may engage, when the elastomeric sealing body is deformed.

Further advantageous developments and convenient forms of the invention will be understood from the following detailed descriptive disclosure of a preferred embodiment thereof in conjunction with the accompanying drawings.

DETAILED DESCRIPTION OF THE PREFERRED EMBODIMENTS

Figure 1:
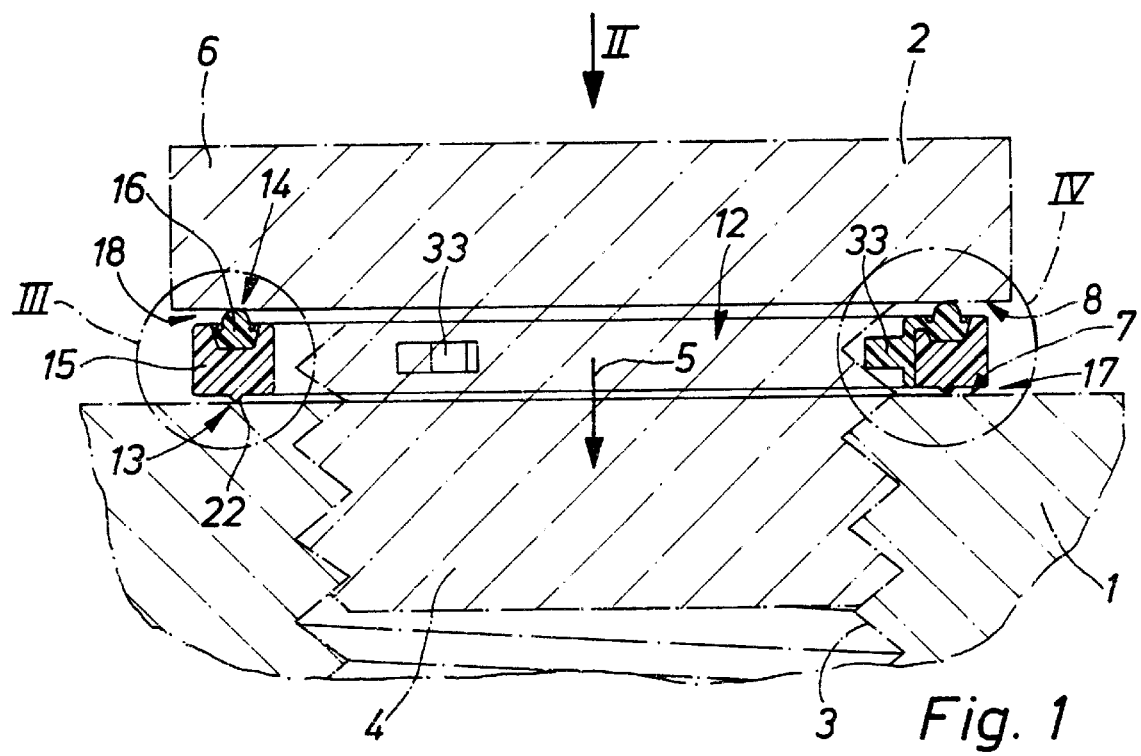
FIG. 1 shows a preferred design of the sealing ring of the invention in a section with an axially and a radially extending plane of section I—I as in FIG. 2, two components to be connected in a fluid-tight manner being indicated diagrammatically in chained lines.
Figure 2:
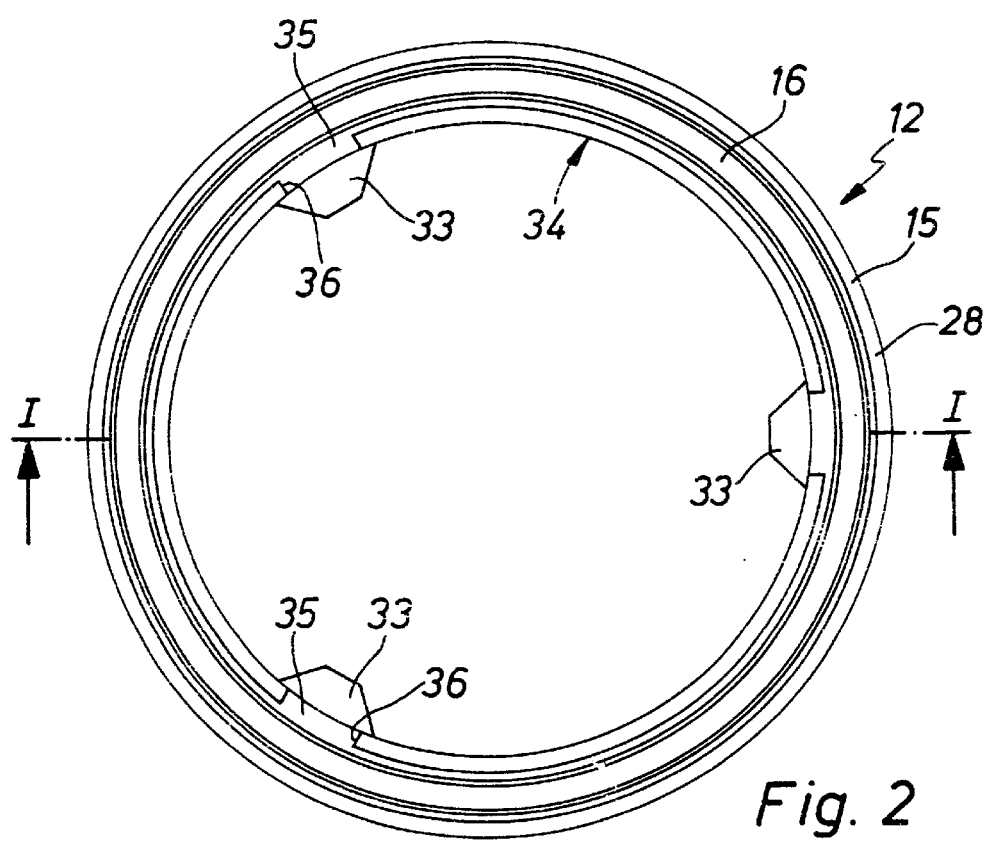
FIG. 2 shows the sealing ring of FIG. 1 in plan view of the axial side having the sealing body and looking in the direction of the arrow II in FIG. 1.

FIG. 1 diagrammatically shows in section two components 1 and 2 to be connected together in a fluid-tight fashion. The first component 1 has for example a recess 3 like a drilled hole, which is provided with an internal screw thread. The second component 2 has a shank- or spigot-like screw threaded part 4, which is provided with an external screw thread fitting the internal screw thread in the recess 3. The screw threaded component 4 may thus be screwed into the recess 3 axially in the direction of the arrow 5.

At one axial end of the screw threaded part 4 the second component 2 has an annular projection 6 extending radially past the screw threaded part 4, such projection 6 being for example constituted by an actuating section of the second component 2, which renders possible the application of a screw driver or wrench.

When the screw threaded part 4 is screwed into the recess 3 two annular sealed faces 7 and 8 provided on the two components 1 and 2 are axially opposite to one another. The first annular sealed face 7 is located on the first component 1 in the peripheral part of the opening of the recess 3. The oppositely placed second annular sealed face 8 is located radially outside the screw threaded part 4 on the side, which is axially opposite the first component 1, of the annular projection 6.

The second component 2 in the working embodiment is constituted by a plug, which is screwed into the recess 3 to close same in fluid-tight manner In the case of the first component 1 it may be a question of a component which contains a fluid, as for example compressed air or oil. Discharge of fluid is prevented by the strewed in plug.

In the case of another embodiment the component 2 can be a connection part, which has a duct leading through it and is connected, or able to be connected, with a rigid or flexible fluid duct. In the screwed-in state a fluid connection is produced between the recess 3 and , through the second component 2, the associated fluid duct. The latter is a typical case of application in pneumatic or hydraulic systems technology, the first component 1 being for instance a valve or a drive means to be operated by fluid power.

Figure 3:
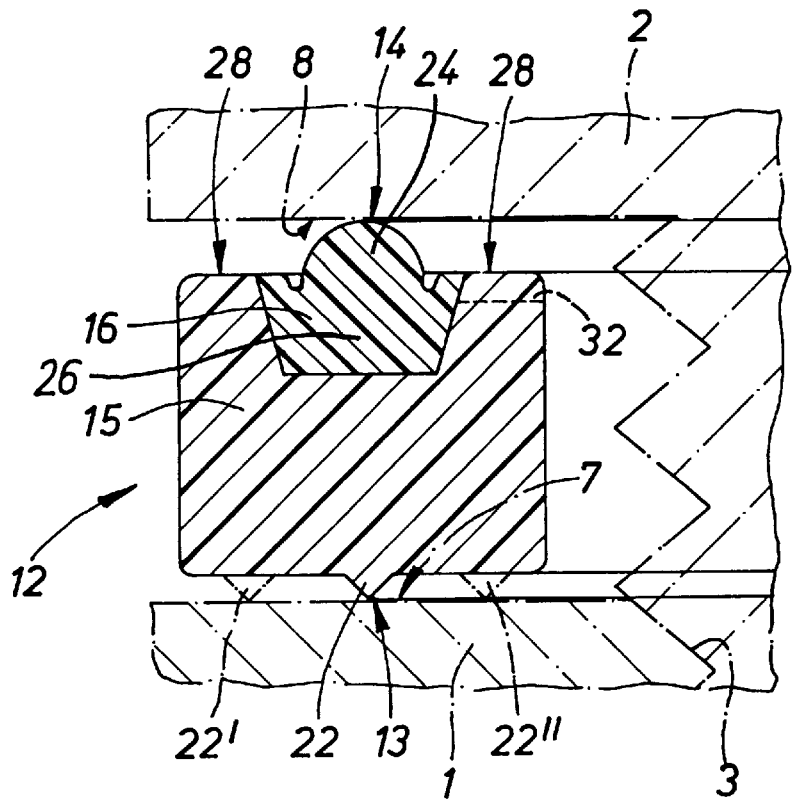
FIG. 3 shows the portion marked III in FIG. 1 on a larger scale.
Figure 4:
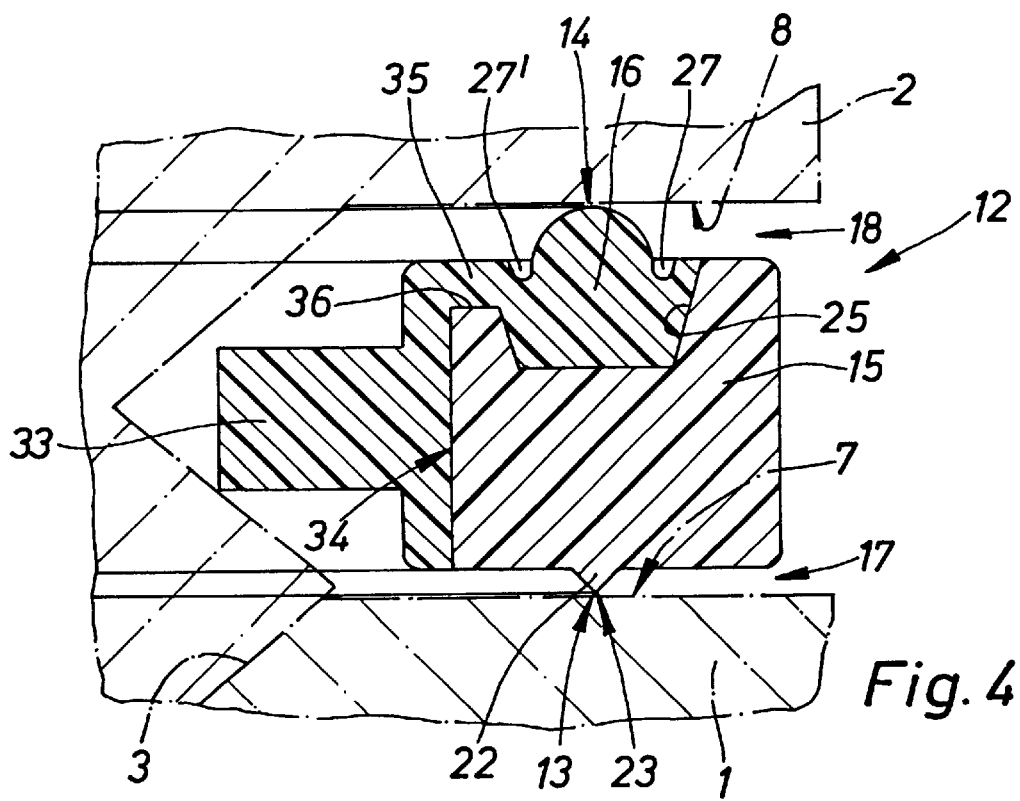
FIG. 4 shows the portion IV marked in FIG. 1 on larger scale.

To provide a seal between the two components 1 and 2 the sealing ring 12 of the invention represented in the drawing as a preferred form is employed. In the fitted state, which is indicated in FIGS. 1, 3 and 4, it assumes a position coaxially between the two facing annular sealed faces 7 and 8, the screw threaded part 4 extending through the sealing ring 12. On each of its two axial sides facing in opposite axial directions the sealing ring 12 has an annular sealing section 13 and 14, the first sealing section 13 facing the first sealed face 7 and the second sealing section 14 facing the second sealed face 8. The second component 2 is screwed into the recess 3 with a sufficient driving torque so that the above mentioned sealing sections 13 and 14 are acted upon by the annular sealed faces 7 and 8 with a sufficient axially directed thrust. This thrust causes a sealing effect, which prevents the passage of fluid between the two components 1 and 2.

The sealing ring 12 is made up of two bodies integrally formed together as part of an injection molding process to give an integral single component, such components being a base body 15 and a sealing body 16 which each have an annular configuration and are concentrically arranged in relation to each other.

The base body 15, which in the working embodiment has a rectangular cross section, consists of thermoplastic synthetic resin and is manufactured as an injection molding. It is a question of a comparatively rigid material so that the sealing body 16 and the sealing ring 12 have a sufficient dimensional stability, similar to that of a rigid body. In contrast to soft, flabby components readily able to bend the sealing ring 12 may consequently be quite satisfactorily handled in automatic assembly equipment as well.

The sealing body 16 is substantially more flexible than the base body 15 and has a rubber-elastic properties, it being manufactured of an elastomeric synthetic resin. Like the base body 15 it is produced by injection molding. The sealing ring thus constitutes a dual-material injection molding, in the case of which the two bodies 15 and 16 are permanently joined together in injection molding.

Manufacture is typically so performed that firstly one of the bodies is molded, after which the other body is formed thereon by the application of the synthetic resin material. The other body is consequently only formed or molded in the course of injection so that the two materials are intimately molded or welded together. It is possible to do without adhesives. It is convenient for firstly the dimensionally stable base body 15 to be produced, onto which then the elastomeric material is injected to form the sealing body 16. Using the method it is possible for extremely high cycle rates to be reached, the intermediate cooling phases being of minimum duration and leading to high numbers of articles being produced per unit time.

It is not only the sealing body but also the base body 15 which has a sealing function in the case of the sealing ring 12. Thus the axial side, which in the working example is the first side facing the first sealed face 7, of the base body 15 constitutes the first sealing section 13. The sealing body 16 is molded on the base body 15, that is to say on the axial side thereof facing the first sealing section 13 and constitutes the second sealing section 14.

Despite the rigidity of the base body 15 owing to the selection of the thermoplastic material and to the resiliency sealing properties are obtained, which in connection with a sealed face 7 with only a low degree of roughness ensure a reliable sealing action. It is therefore possible to do without a further elastomeric part on the corresponding axial side of the sealing ring 12, something which leads to more economic production.

If in the course of time creep and deformation of the material of the base body 15 should occur, such deformation will not cause a reduction in the quality of sealing, since the sealing body 16 is capable of automatic compensation of the deformation of the material owing to its rubber-elastic properties.

In order to produce an improvement of the sealing effect in the first sealing portion 17 between the base body 15 and the first component 1 in certain cases, on its first sealing section 13 the base body 15 may, as illustrated, have an annular concentrically arranged axial projection 22. Such projection is preferably so designed that it tapers in a direction axially away from the base body 15 and an annular sealing edge 23 is produced, which is in linear contact with the facing first sealed face 7.

In the working embodiment a single axial projection 22 is present, which is located on the respective axial side radially in the middle on the base body 15 so that there is an even transmitting of force.

It would be certainly feasible to provide several axial projections 22, which are more especially arranged concentrically in relation to each other, as is illustrated in chained lines in FIG. 3 in the form of two axial projections 22 and 22'. By having several such axial projections it is also possible to achieve a sealing effect akin to that of a labyrinth seal even in cases in which the axial projection 22 does not have any sharp sealing edge.

In the working embodiment the sealing body possesses an annular sealing bead 24, which extends past the base body 15 axially toward the second sealed face 8 and is responsible for the sealing effect in the second sealing portion 18 between the sealing ring 12 and the second component 2. If the two components 1 and 2 are moved in relation to each other axially the sealing bead 24 will be squeezed and subject to deformation, it coming into snug engagement with the second sealed face 8 and, owing to its resiliency and elasticity, is able to compensate even for coarse surface irregularities and to ensure a reliable sealing contact.

The sealing body 16 is preferably held in an annular groove 25, which is machined in the base body 15 at the axial side thereof opposite to the first sealing section 13. The sealing body 16 has an annular attachment section 26 holding it in the annular groove 25 and has its sealing bead 24, which is integrally formed, extending axially past the base body 15.

It is preferred for the radially measured width of the annular attachment section 26 to be larger than the width of the sealing bead 24. In this respect it is preferred for a concentrically arranged annular groove-like recess 27 and 27' to be provided radially inside and radially outside between the sealing bead 24 and the attachment section 26 in the respective transition zone, such recess being able to accommodate the material of the sealing bead 24 on axial squeezing of the sealing ring 12.

The sealing ring 12 may be so designed that the two components 1 and 2 may be drawn together in relation to each other until there is a "rock bottom" engagement and abutment of parts. In this case the sealing body 16 is deformed so far that acting at its second annular sealed face 8 the second component 2 has so far deformed the sealing bead 24 that it engages an opposite support face 28 on the base body 15. This support face 28 is axially aligned and is located on the axial side, bearing the sealing body 16, of the base body 15 radially outside and radially within the sealing body 16.

It would be feasible as well to provide a support face on but one radial side of the sealing body 16. Thus the base body 15, as illustrated in chained lines in FIG. 3, could possess a concentrically encircling, annular recess 32 with the sealing body 16. Such recess 32 could if required act as a receiving space, which could take up deformed material of the incompressible sealing body. It is with this modification that the elastomeric material could be allowed to move out of the way on bracing the sealed faces 7 and 8 and not be damaged.

In accordance with a preferred development the sealing ring 12 could have several holding projections 33 distributed about its inner periphery which serve to hold the sealing ring 12 after slipping it onto the threaded part 4 so that it cannot drop off. In addition to this or as an alternative the holding projections 33 can also serve to ensure the maintenance of any desired concentric relative setting between the sealing ring 12 on the one hand and the sealed faces 7 and 8 on the other hand. This effect could be termed a centering effect.

In the working embodiment the holding projections 33 fit into the recesses of the external screw thread on the threaded part 4. Since same consist of rubber-elastic material, they will not obstruct the fitting of the sealing ring 12 to the threaded part 4, and the sealing ring 12 can be slipped into position without any difficulty coaxially with an elastic deformation of the holding projections 33.

In relation to the base body 15 the holding projections 33 extend radially outward, and thus project inwardly past the base body 15. Their lateral faces facing in the peripheral direction can be cut to be oblique so that they taper radially toward the center of the sealing ring 12. Their distribution along the periphery of the sealing ring 12 is preferably a regular one, and in the case of the working embodiment three holding projections 33 are provided.

The holding projections 33 are preferably integral with the sealing body 16 and may consequently be molded while injection molding the sealing body 16. It is convenient for them to be so placed that they abut the radially inwardly facing inner peripheral face 34 of the base body 15 and are more particularly here permanently formed in place by the injection molding operation.

In the working example each holding projection 33 has at least one connecting rib 35 integrally joined with the sealing body 16. These connecting ribs 35 are preferably sunk in the base body 15. On the axial side having the sealing body 16 the base body 15 possesses groove-like recesses 36 extending between the annular groove 25 and the inner peripheral face 34, such recesses 36 receiving the connecting ribs 35 in the working example completely. In the working embodiment the axially directed outer face of the connecting ribs 35 extends in a direction which is at least approximately the same as that of the plane at a right angle to the longitudinal axis of the sealing ring 12 like the support face 28.

What is claimed is:

1. A sealing ring comprising:
    an annular base body having an inner peripheral face and a first annular sealing section, said base body being made of thermoplastic synthetic resin for providing dimensional stability;
    an annular sealing body having a second annular sealing section, said sealing body being arranged concentrically in relation to said base body and made of elastomeric synthetic resin having rubber-elastic properties, said sealing body being permanently molded onto said base body such that said first sealing section and said second sealing section are located on opposite axial sides; and
    a plurality of holding projections distributed about and molded on said inner peripheral face while extending radially inward from said base body, each of said holding projections being connected to said sealing body by at least one connecting rib and being formed integrally with said sealing body.

2. The sealing ring as set forth in claim 1, wherein said base body includes at least one annular axial projection arranged concentrically on said first annular sealing section.

3. The sealing ring as set forth in claim 2, wherein said at least one annular axial projection has a sealing edge.

4. A sealing ring comprising:

an annular base body having a first annular sealing section and an annular groove, said base body being made of thermoplastic synthetic resin for providing dimensional stability; and an annular sealing body having a second annular sealing section, at least one sealing bead, and an annular attachment section, said sealing body being arranged concentrically in relation to said base body and made of elastomeric synthetic resin having rubber-elastic properties, said sealing body being permanently molded onto said base body with said annular attachment section cooperating with said annular groove such that said at least one annular sealing bead projects axially past said base body and said first sealing section and said second sealing section are located on opposite axial sides.

5. The sealing ring as set forth in claim 4, wherein said annular sealing body is formed with an annular recess in said annular attachment section radially inside of said sealing bead.

6. The sealing ring as set forth in claim 4 wherein said annular sealing body is formed with an annular recess in said annular attachment section radially outside of said sealing bead.

7. The sealing ring as set forth in claim 4, wherein said annular sealing body is formed with a pair of annular recesses in said annular attachment section with one of said pair of annular recesses being radially inside of said sealing bead and one of said pair of annular recesses being radially outside of said sealing bead.

8. The sealing ring as set forth in claim 4, wherein said base body has an inner peripheral face; and further comprises:

a plurality of holding projections distributed about and molded on said inner peripheral face while extending radially inward from said base body, each of said holding projections being connected to said sealing body by a connecting rib.

9. The sealing ring as set forth in claim 8, wherein said base body is formed with a plurality of recesses that extend from said annular groove to said inner peripheral face for receiving said connecting rib of said holding projections.

10. The sealing ring as set forth in claim 4, wherein said base body includes at least one annular axial projection arranged concentrically on said first annular sealing section.

11. The sealing ring as set forth in claim 10, wherein said at least one annular axial projection has a sealing edge.

\* \* \* \* \*